(12) United States Patent
Saito et al.

(10) Patent No.: US 6,237,316 B1
(45) Date of Patent: May 29, 2001

(54) OPTICAL FIBER RIBBON STRANDING METHOD AND DEVICE

(75) Inventors: Koichi Saito; Masakazu Watanabe; Masatoshi Yasui; Ken Takahashi, all of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/264,862

(22) Filed: Mar. 9, 1999

(30) Foreign Application Priority Data

Mar. 11, 1998 (JP) .................................................. 10-059218

(51) Int. Cl.⁷ .................................................. D01H 13/04
(52) U.S. Cl. .................................................. 57/314; 57/361
(58) Field of Search .................................................. 57/6, 13, 11, 3, 57/314, 9, 352, 361, 7, 67

(56) References Cited

U.S. PATENT DOCUMENTS 4,129,468 * 12/1978 Knab ......................................... 57/13
5,331,796 * 7/1994 Varga ......................................... 57/13
5,487,261 * 1/1996 Varga ......................................... 57/13

FOREIGN PATENT DOCUMENTS

95/20698    8/1995  (WO) ......................................... 57/13

* cited by examiner

*Primary Examiner*—Danny Worrell
(74) *Attorney, Agent, or Firm*—McDermott, Will & Emery

(57) ABSTRACT

In order to superimpose and store optical fiber ribbons in a corresponding one of spiral grooves provided in the outer circumferential surface of a spacer, an optical fiber ribbon stranding device includes: a device for advancing the spacer straight while rotating the spacer around the center axis of the spacer, the advancing device being constituted by, for example, a tension giving device and a take-up device; a device for feeding a plurality of optical fiber ribbons; a guide die for guiding the optical fiber ribbons into the corresponding one of the spiral grooves; and an alignment keeping guide disposed upstream of the guide die. A rectangular hole is provided to extend through the alignment keeping guide, and the optical fiber ribbons are passed through and superimposed by the hole. The optical fiber ribbons kept in a superimposed state by the alignment keeping guide is introduced and accommodated into the corresponding one of the grooves of the spacer through the guide die.

14 Claims, 7 Drawing Sheets

OPTICAL FIBER RIBBON STRANDING METHOD AND DEVICE

BACKGROUND OF THE INVENTION

1. Field of the Invention

The present invention relates to an optical fiber ribbon stranding device for superimposing a plurality of optical fiber ribbons and accommodating the optical fiber ribbons thus superimposed into a corresponding one of spiral grooves provided in the outer circumferential surface of a spacer or slotted rod. The present invention also relates to a device for practicing that method.

2. Description of Related Art

An optical fiber cable is provided with aso-called spacer or slotted rod to protect optical fibers. The spacer is formed so that a plastic material, such as polyethylene or the like, is extrusion-molded on and around a tensile body, such as a steel wire, a steel stranded wire, FRP or the like, to have a plurality of spiral grooves in its outer circumferential surface.

FIG. 3 is a perspective view showing an example of such spacer. The spacer 20 includes: a tensile body 21 consisting of a steel wire, a steel stranded wire, FRP or the like; an accommodation body 22 consisting of a plastic material such as polyethylene or the like; and grooves 23 formed spirally in the outer circumferential surface of the accommodation body 22. The spiral direction of the grooves may be reversed to that shown in FIG. 3. The spacer 20 can accommodate, in these grooves 23, various optical fibers including an individual optical fiber in which a glass fiber is coated with a primary coating (consisting of one or more resin layers), and a united optical fibers (i.e. an optical fiber ribbon) in which a plurality of such individual optical fibers are arranged in parallel and further coated together with a secondary coating.

FIG. 4(A) is a cross-sectional view showing an example of such optical fiber cable, and FIG. 4(B) is a cross-sectional view of an optical fiber ribbon. A plurality of individual optical fibers 33a each of which is formed of a glass fiber coated with ultraviolet curing resin or the like as a primary coating are arranged in parallel, and entirely coated with coating 33b of ultraviolet curing resin or the like as a secondary coating, thereby forming an optical fiber ribbon 33.

An accommodation body 32 consisting of a plastic material and having a plurality of spiral grooves 32a is formed on and around a tensile body 31 consisting of a steel wire, a steel stranded wire, FRP or the like, thereby forming a spacer. A plurality of optical fiber ribbons 33 are superimposed one on another and accommodated in each of the grooves 32a of the spacer. A wrapping 34 is applied onto the spacer. An external coating 35 consisting of a plastic material or the like is provided on the wrapping 34. Then, an optical fiber cable is formed.

To manufacture the optical fiber cable of this type, a stranding step of superimposing and accommodating the optical fiber ribbons in each of spiral grooves of a spacer is required. FIG. 5(A) is a front view showing an example of a stranding device used for practicing such stranding step. A spacer 41 is fed out of a reel 38, advanced to the right straight by a take-up device (a belt capstan) 45 while being braked by a tension giving device (a belt capstan) 39, and then taken up on a reel 46. At least the tension giving device 39 and the take-up device 45 are rotated around their axes in association with the advance of the spacer 41 in the direction of the spiral grooves of the spacer 41. That is, the devices 39 and 45 are rotated at the same cycle as the spiral grooves are rotated in association with the advance of the spacer 41. Consequently, each of the grooves extending between the tension giving device 39 and the take-up device 45 is viewed as if it is kept in the same position with respect to a fixed point of the earth.

As illustrated, optical fiber ribbons 42 are fed out of a plurality of reels 37 respectively, passed through a groove formed in a guide die 40, and introduced into a groove of the spacer 41 advanced in the above-described manner. In this case, since the groove of the spacer 41 intersects the guide die 40 in the same position with respect to the earth, the guide die 40 can introduce the optical fiber ribbons 42 into the groove of the spacer 41 even if the guide die 40 is arranged stationary. Note that optical fiber ribbons, which are omitted in FIGS. 5(A) and 5(B) to simplify the illustration, are similarly fed out of respective reels and accommodated by the guide die 40 into corresponding grooves of the spacer 41. The reference numeral 43 represents a pressing die; and 44, a spacer in which optical fiber ribbons have been accommodated in the grooves. A rough winding, a tape winding and so on may be applied onto the spacer 44 before or after the spacer 44 is passed through the pressing die 43 depending on the need.

FIG. 5(B) is an enlarged front view of FIG. 5(A), showing how the guide die 40 guides the optical fiber ribbons 42 into the groove of the spacer 41. FIG. 5(c) is a perspective view showing the guide die 40. A plurality of optical fiber ribbons 42 are passed through each of the grooves 40a formed in the guide die 40 to be introduced into a corresponding one of the grooves of the spacer 41.

The guide die 40 is provided with a circular hole 40b circular in section and extending along its central axis so that spacer 41 is passes through the circular hole 40b. Further, a plurality of inwardly projecting protrusions (not shown) are fixedly provided on the inner circumference of the circular hole 40b of the guide die 40 and inserted into the respective grooves of the spacer 41 so that the grooves of the spacer 41 surely intersect the same positions of the guide die 40, respectively, with respect to the fixed point of the earth when the spacer 41 is passed through the guide die 40.

In place of the guide die 40, a thin disc-like plate having a circular central hole and a plurality of circular holes arranged about the central hole may be used to guide a plurality of optical fiber ribbons 42 to the spacer 41.

Such a method is also available that optical fiber ribbons are introduced into grooves of a spacer without using a guide die. FIGS. 6(A) and (B) are a perspective view and a front view, respectively, showing an example of such method, in which a plurality of optical fiber ribbons 42 are introduced one by one into the groove 41a of a spacer 41 while being separated one from another by a spring-like ring (i.e. a spiral separator) 47 so that the optical fiber ribbons 42 are placed in the groove 41a in a superimposed fashion.

Of the manufacturing methods described above, the method employing a guide die to introduce optical fiber ribbons into each groove of a spacer has the following defect: The optical fiber ribbons that are to be superimposed in one groove of the spacer are inserted into corresponding one groove of the guide die, but the mutual positional relationship of the individual optical fiber ribbons is not fixed so that the superimposed state is unstable within the guide die. Consequently, the optical fiber ribbons are likely to be inclined within the groove of the guide die, and the superimposing order of the optical fiber ribbons is changed at the worst. That it, the alignment is apt to be disordered.

In the method employing a spiral separator, the mutual positional relationship of individual optical fiber ribbons is not fixed, so that the optical fiber ribbons are passed through the corresponding ring parts of the spiral separator in a state where the superimposed state is not determined. Since the optical fiber ribbons enter into the corresponding ring parts of the spiral separator in the unstable state, the optical fiber ribbons may be stripped or damaged by the ring parts of the spiral separator.

SUMMARY OF THE INVENTION

An object of the present invention is to provide an optical fiber ribbon stranding device and an optical fiber ribbon stranding method, which are free from the above-noted disadvantages.

To attain the above-noted object, an optical fiber ribbon stranding device and an optical fiber ribbon stranding method of the present invention are characterized in that optical fiber ribbons are passed through a rectangular hole of guide means so that the optical fiber ribbons are superimposed one on another and a superimposed state of the optical fibers are made stable before they are introduced into a corresponding one of spiral grooves of a slotted rod or grooved spacer.

An optical fiber ribbon stranding device of a preferred embodiment includes a supply/take-up device for advancing the spacer straight while rotating the spacer around the center axis of the spacer, a device for feeding a plurality of optical fiber ribbons, a guide die for guiding the optical fiber ribbons into a corresponding one of the spiral grooves of the spacer, and an alignment keeping guide disposed immediately before the guide die. A rectangular hole is provided to extend through the alignment keeping guide, and the optical fiber ribbons are passed through and superimposed by the hole so that the optical fiber ribbons are kept in a superimposed state. The optical fiber ribbons thus superimposed are guided by the guide die to be introduced into the corresponding one of the spiral grooves of the spacer.

It is preferable that the hole of the alignment keeping guide is formed to have a height which is 1.1 to 1.9 times as high as the height of the superimposed optical fiber ribbons, a width which is 1.05 to 1.20 times as wide as the width of the superimposed optical fiber ribbons, and a length which is not shorter than 10 mm. The hole of this dimension can surely prevents the optical fiber ribbons from rotating inside the hole. It is therefore possible to introduce the superimposed optical fiber ribbons into the groove of the spacer through the guide die in a stable manner without occurrence of disorder in the alignment.

It is preferable to form the alignment keeping guide of fluorine resin since the friction between the optical fiber ribbons and the wall surfaces of the hole of the alignment keeping guide can be reduced and the damage caused on the optical fiber ribbons can be eliminated.

A spiral separator may be provided between the guide die and a point where the optical fiber ribbons are inserted into the groove of the spacer. The spiral separator temporarily separates the optical fiber ribbons thus superimposed. This temporary separation reduces the friction between adjacent optical fiber ribbons, and permits speed differences of the optical fiber ribbons depending on the radial location where the optical fiber ribbons are installed in the groove of the spacer. That is, the speeds at which the optical fiber ribbons are inserted into the groove of the spacer can be made higher on the groove top side than on the groove bottom side. As a result, the optical fiber ribbons can be accommodated in the groove of the spacer with an optimum tension.

A lubricant application device for applying lubricant such as talc or the like may be provided upstream of the alignment keeping guide. Since the optical fiber ribbons are inserted into and superimposed by the hole of the alignment keeping guide after lubricant has been applied to the optical fiber ribbons, the friction between adjacent optical fiber ribbons in the superimposed state can be reduced, and mutual slippage of the optical fiber ribbons can be facilitated.

The present disclosure relates to the subject matter contained in Japanese patent application No. Hei. 10-59218 (filed on Mar. 11, 1998), which is expressly incorporated herein by reference in its entirety.

DETAILED DESCRIPTION OF THE PREFERRED EMBODIMENT

Figure 1A:
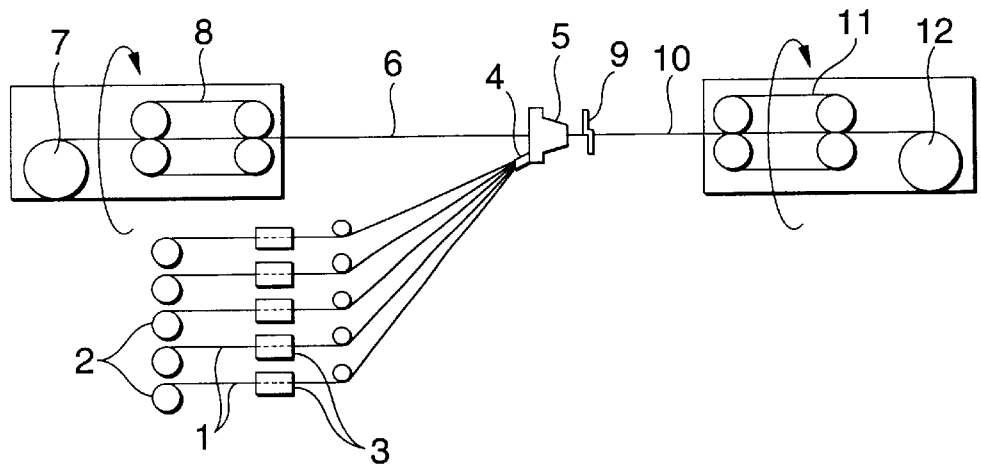
FIG. 1(A) is a front view showing an embodiment of an optical fiber ribbon stranding device according to the present invention.

FIG. 1(A) is a front view showing an embodiment of an optical fiber ribbon stranding device according to an embodiment of the present invention. In FIG. 1(A), a plurality of optical fiber ribbons 1 are fed out of reels 2 respectively, and then lubricant such as talc is applied to the ribbons 1 by lubricant application devices 3. Application of lubricant such as talc may be omitted in some cases. Then, the optical fiber ribbons 1 reach a guide die 5 through an alignment keeping guide 4.

On the other hand, a spacer 6 is fed out of a supply reel 7, and advances straight while rotating around its axis in the same direction and at the same cycle as spiral grooves of the spacer 6. As the devices for advancing and rotating the spacer 6 as described above, a tension giving device 8 and a take-up device 11 each in the form of a belt capstan are used in the embodiment of FIG. 1(A). However, the devices are not limited to the illustrated ones of FIG. 1(A) so long as they can advance the spacer straight and rotate the spacer around its axis synchronously with the rotational direction and rotational cycle of the grooves of the spacer. The tension giving device 8 and the take-up device 11 rotate around their axes in the arrow directions together with the supply reel 7 and the take-up reel 12 respectively.

Since the spacer 6 is given tension between the tension giving device 8 and the take-up device 11 so as to advance straight from the tension giving device 8 side to the take-up device 11 side while being rotated around its axis in the same direction and at the same cycle as the spiral grooves, each groove of the spacer 1 extending between the devices 8 and 11 is viewed as if it is stationary with respect to the fixed point of the earth. Accordingly, the optical fiber ribbons 1 are inserted and stored into each groove with the advance of the spacer 6 when the guide die 5 is simply held stationary with respect to the fixed point of the earth and the optical fiber ribbons 1 are passed through each hole or groove formed in the guide die 5 to be introduced into each groove of the spacer 6.

The optical fiber ribbons 1, before being passed through the guide die 5, are superimposed one on another and passed through a hole (rectangular in section) of the alignment keeping guide 4. The alignment keeping guide 4 in this embodiment is brought into abutment with the guide die 5 so as to be located upstream of the guide die 5. The alignment keeping guide 4 may be fixed to the guide die 5. The alignment keeping guide 4 serves to determine or define the superimposed state of the optical fiber ribbons 1 and introduce the optical fiber ribbons 1 thus superimposed into a corresponding groove or hole of the guide die 5. Consequently, the optical fiber ribbons 1 thus superimposed are passed through the hole or groove of the guide die 5 and introduced into a corresponding groove of the spacer 6, so that the whole of the optical fiber ribbons 1 in the superimposed state can be stored in the groove of the spacer 6.

Figure 5A:
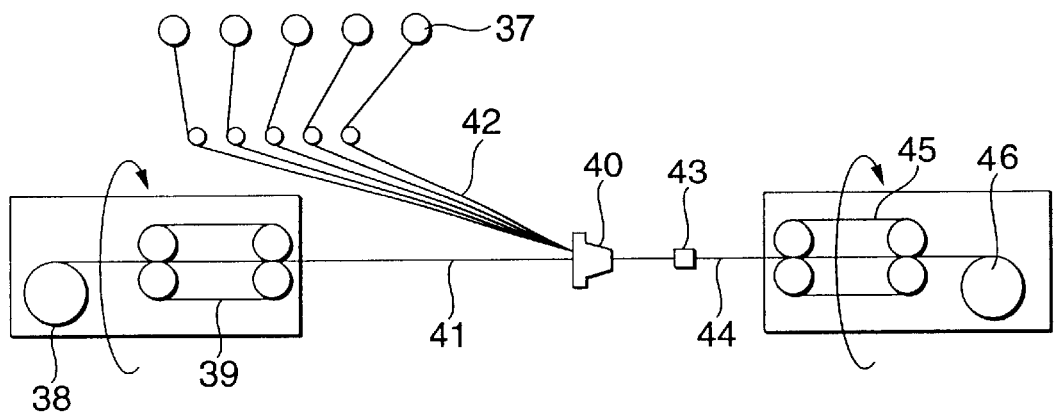
FIG. 5(A) is a front view of a background art optical fiber ribbon stranding device.
Figure 5B:
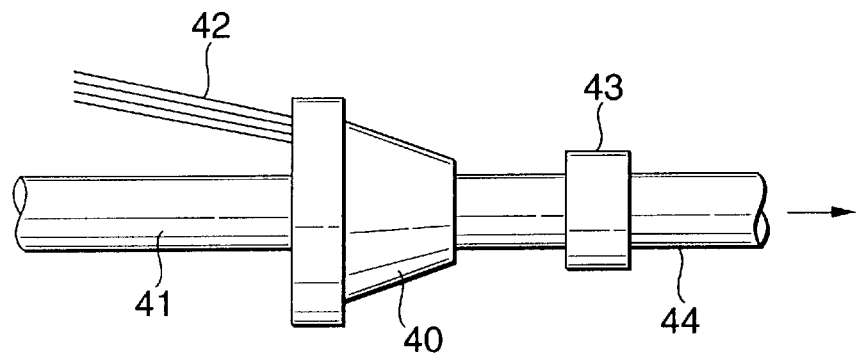
FIG. 5(B) is an enlarged front view of the vicinity of a guide die of the optical fiber ribbon stranding device.
Figure 5C:
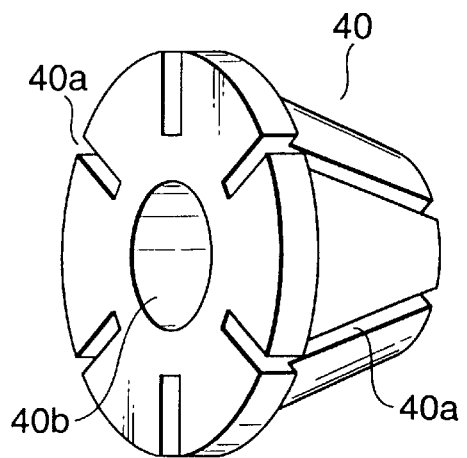
FIG. 5(c) is a perspective view of an example of the guide die.
Figure 6A:
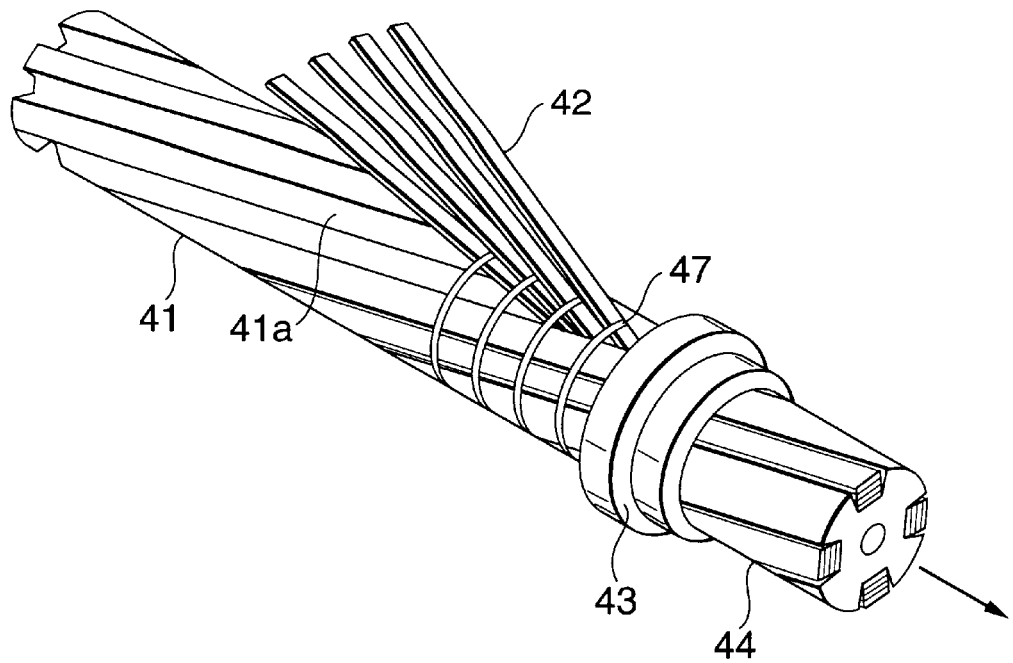
FIG. 6(A) is a perspective view, showing an example of an optical fiber ribbon stranding device using a spiral separator.
Figure 6B:
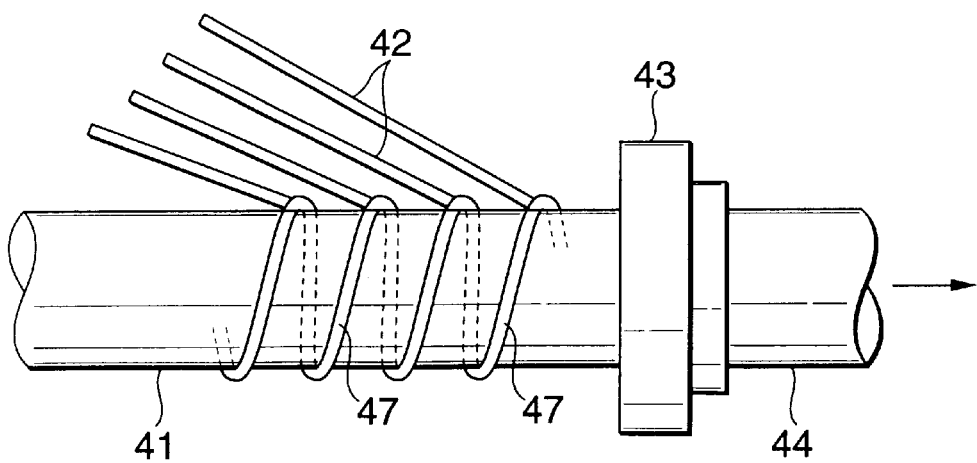
FIG. 6(B) is a front view of the optical fiber ribbon stranding device showm in FIG. 6A.

As for the guide die in this embodiment, a guide die 5 as shown in FIG. 5 can be used. A thin disc-like plate having a central hole and a plurality of holes arranged about the central hole can also be used. As explained previously, one or a plurality of inwardly projecting protrusions may be provided on the circumferential surface of the center hole of the guide die and inserted into the grooves of the spacer so as to assure more accurate relative rotation between the spacer and the guide die (i.e. the accurate matching of the grooves of the guide die with respect to the grooves of the spacer).

A pressing device 9 of fiber rope or the like or a pressing die is provided downstream of the guide die 5 around the circumference of the spacer 6 so as to push the optical fiber ribbons 1 in the groove of the spacer 6. A rough winding, an upper winding and so on may be applied onto the spacer 6 before and/or after this pushing-in work is carried out depending on the needs. Then, the stranded structure 10 is taken up onto the take-up reel 12 while being drawn by the take-up device 11.

Figure 1B:
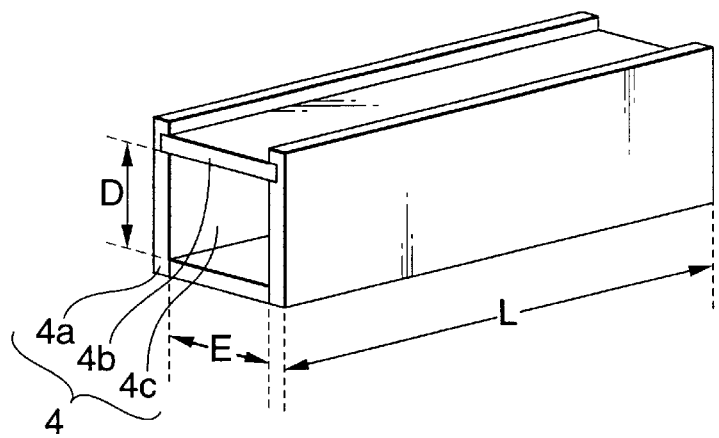
FIG. 1(B) is a perspective view of an alignment keeping guide.
Figure 1C:
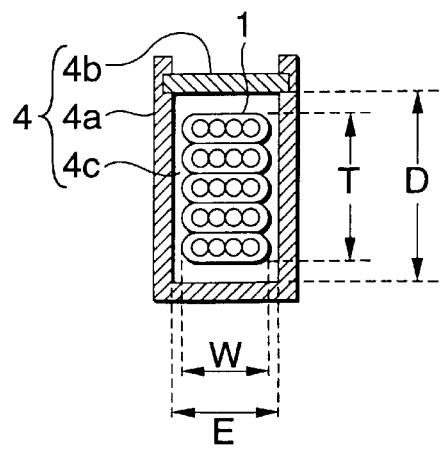
FIG. 1(C) is a cross-sectional view when optical fiber ribbons in a superimposed state are passed through the alignment keeping guide.

Next, description will be made about the alignment keeping guide 4 used in this embodiment. FIG. 1(B) is a perspective view of the alignment keeping guide 4, and FIG. 1(C) is a sectional view of the alignment keeping guide 4 to which optical fiber ribbons 1 have been inserted. The alignment keeping guide 4 is a tubular body of fluorine resin, polyethylene, metal or the like having a hole rectangular in section. The alignment keeping guide 4 is constituted by a U-shaped member 4a having grooves and a cover member 4b received by the grooves to define a rectangular hole 4c as shown in FIG. 1(B).

The size of the hole 4c is set to be slightly larger than the size of the superimposed optical fiber ribbons 1 as shown in FIG. 1(C). More specifically, the hole 4c has a height D set to be 1.1 to 1.9 times as high as the height T of the superimposed optical fiber ribbons 1, and a width E set to be 1.05 to 1.20 times as wide as the width W of the superimposed optical fiber ribbons 1. By setting the size of the hole 4c in this manner, it is possible to surely prevent the optical fiber ribbons 1 from being dislodged laterally, turned upside down and changed in superimposed order within the hole 4c. Although it is preferable that the length L of the alignment keeping guide to be used is selected to be about 30 to 50 mm, the alignment keeping guide having the length of 10 mm or more may be used in order to fix and keep the superimposed state of the optical fiber ribbons 1.

During the process in which the optical fiber ribbons 1 are passed through the hole of the alignment keeping guide 4 and stored in the groove of the spacer 6 by the guide die 5, the optical fiber ribbons 1 advance at respective speeds slightly different from one another. That is, since optical fiber ribbons 1 are superimposed in the groove of the spacer 6 in a radial direction with respect to the spacer 6, the optical fiber ribbon 1 that is located at a radially inward position of the groove is smaller in spiral radius, whereas the optical fiber ribbon 1 that is located at a radially outward position of the groove is larger in spiral radius, thereby resulting in the advancing speed differences of the optical fiber ribbons 1. To permit the advancing speed differences of the optical fiber ribbons 1 while determining the superimposed, state of the optical fiber ribbons 1, the alignment keeping guide 4 is designed to permit the mutual slippage of the optical fiber ribbons 1. This also makes the longitudinal tensions, which act on respective optical fiber ribbons 1, uniform to one another when the optical fiber ribbons 1 are stored in the groove of the spacer 6.

For this reason, the height D of the hole 4c of the alignment keeping guide 4 is set to be 1.1 or more times as high as the height T of the superimposed optical fiber ribbons 1. Further, it is preferable to select fluorine resin as the material of the alignment keeping guide 4 since the friction between the optical fiber ribbons 1 and the wall surface of the hole of the alignment keeping guide 4 can be reduced effectively.

In order to facilitate the mutual slippage of the superimposed optical fiber ribbons 1, it is also effective to apply lubricant such as talc to the optical fiber ribbons 1 by passing the optical fiber ribbons 1 through the lubricant application device 3 after the optical fiber ribbons 1 have fed out of the reels 2, as shown in FIG. 1(A).

Further, the alignment keeping guide 4 shown in FIGS. 1(B) and (C) is constituted by the grooved member 4a and the cover member 4b removable from the grooved member 4. This is because the removable cover member 4b makes it possible to ease the initial access (i.e. the initial insertion) of the optical fiber ribbons 1 into the inside of the grooved member 4a. This is not essential to the present invention, and the grooved member 4a and the cover member 4b may be formed integrally to constitute a one-piece alignment keeping guide since the one-piece guide provides the same function in keeping the alignment or superimposed state of the optical fiber ribbons 1.

Although the aforementioned example has been described about the case where the alignment keeping guide 4 is constituted separately from the guide die 5, the alignment keeping guide 4 and the guide die 5 may be manufactured integrally with each other. That is, an alignment keeping guide 4 may be fixedly provided on the guide die 5 so as to correspond to each of the grooves of the guide die 5. Alternatively, the guide die 5 may be designed to have the hole 4c of the alignment guide die 4 in place of each of the grooves of the guide die 5 so that guide die 5 itself has the advantageous function of the alignment keeping guide 4. In the latter case, the length L of the hole formed through the guide die 5 is preferably about 20 mm to 60 mm, and more preferably about 40 mm. In these cases in which the alignment keeping guide 4 and the guide die 5 are manufactured integrally with each other, however, the number of such integrated devices to be manufactured increases since the guide die 5 need to be prepared depending on the number of the grooves of the spacer 6 and the outer diameter of the spacer 6 and since the alignment keeping guide 4 need to be prepared depending on the size of the superimposed optical fiber ribbons 1. Therefore, it is advantageous, in view of the manufacturing cost, to manufacture the alignment keeping guide 4 separately from the guide die 5.

Further, the guide die 5 is generally made from steel, iron or the like, whereas the alignment keeping guide 4 is generally made from fluorine resin, polyethylene or the like. Accordingly, it is preferable that the guide die 5 and the alignment keeping guide 4 are manufactured separately from each other in view of material. Furthermore, if the guide die 5 and the alignment keeping guide 4 are manufactured separately, the alignment keeping guide 4 can move in accordance with horizontal vibrations of the optical fiber ribbons 1. That is, the superimposed state can be kept satisfactorily by the alignment keeping guide 4 even if the optical fiber ribbons 1 vibrate more or less, and the optical fiber ribbons 1 are less-damaged.

Figure 2A:
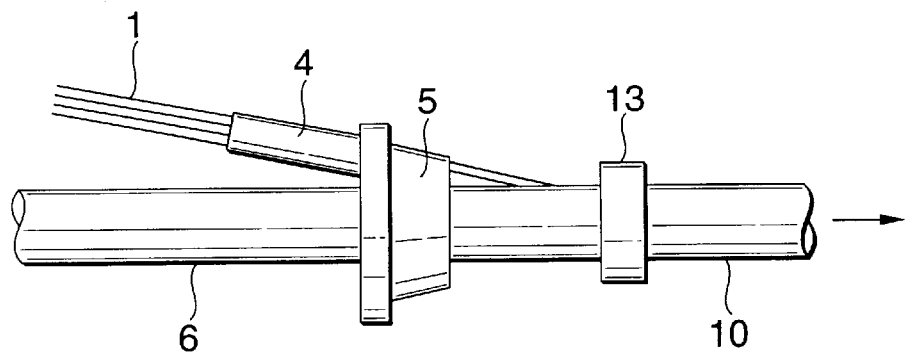
FIGS. 2(A) and (B) are front views showing the vicinity of the alignment keeping guide in an embodiment of an optical fiber ribbon stranding device according to the present invention respectively.

FIGS. 2(A) and (B) show front views of the stranding device in the vicinity of the alignment keeping guide 4. FIG. 2(A) shows an example in which a plurality of optical fiber ribbons 1 are superimposed and held by the alignment keeping guide 4, passed through the guide die 5, stored in a groove of the spacer 6 while being kept in the superimposed state, and pressed by a pressing die 13, thereby forming the stranded structure 10.

Figure 2B:
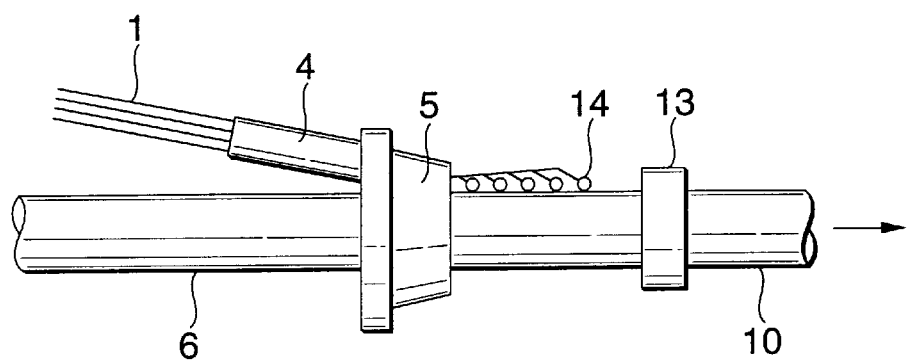
FIG. 2(C) is a cross-sectional view showing an example of a pressing device.

FIG. 2(B) shows an example in which a plurality of optical fiber ribbons 1 are superimposed and held by the alignment keeping guide 4, passed through the guide die 5, temporarily separated from each other by a spiral separator 14 so that the mutual slippage of the optical fiber ribbons 1 are facilitated, superimposed again and stored in a groove of the spacer 6 with an optimum tension, and pressed by a pressing die 13, thereby forming the stranded structure 10. In this case, since the optical fiber ribbons 1 are slightly separated from each other once after they are superimposed by the alignment keeping guide 4, and since the insertion angle of each optical fiber ribbons 1 into the respective ring part of the spiral separators 14 is small, the optical fiber ribbons 1 are free from the problem that the optical fiber ribbons 1 may be stripped or damaged by the ring parts of the spiral separator 14. Further, since the optical fiber ribbons 1 are returned again to the superimposed state immediately after the superimposed optical fiber ribbons 1 are separated from each other temporarily, the superimposed state is not disordered.

Figure 2C:
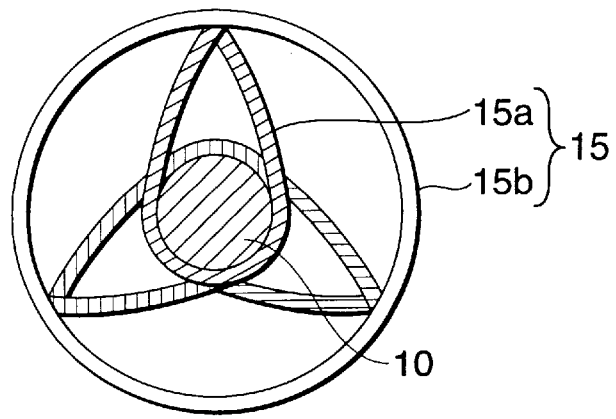
Figure 3:
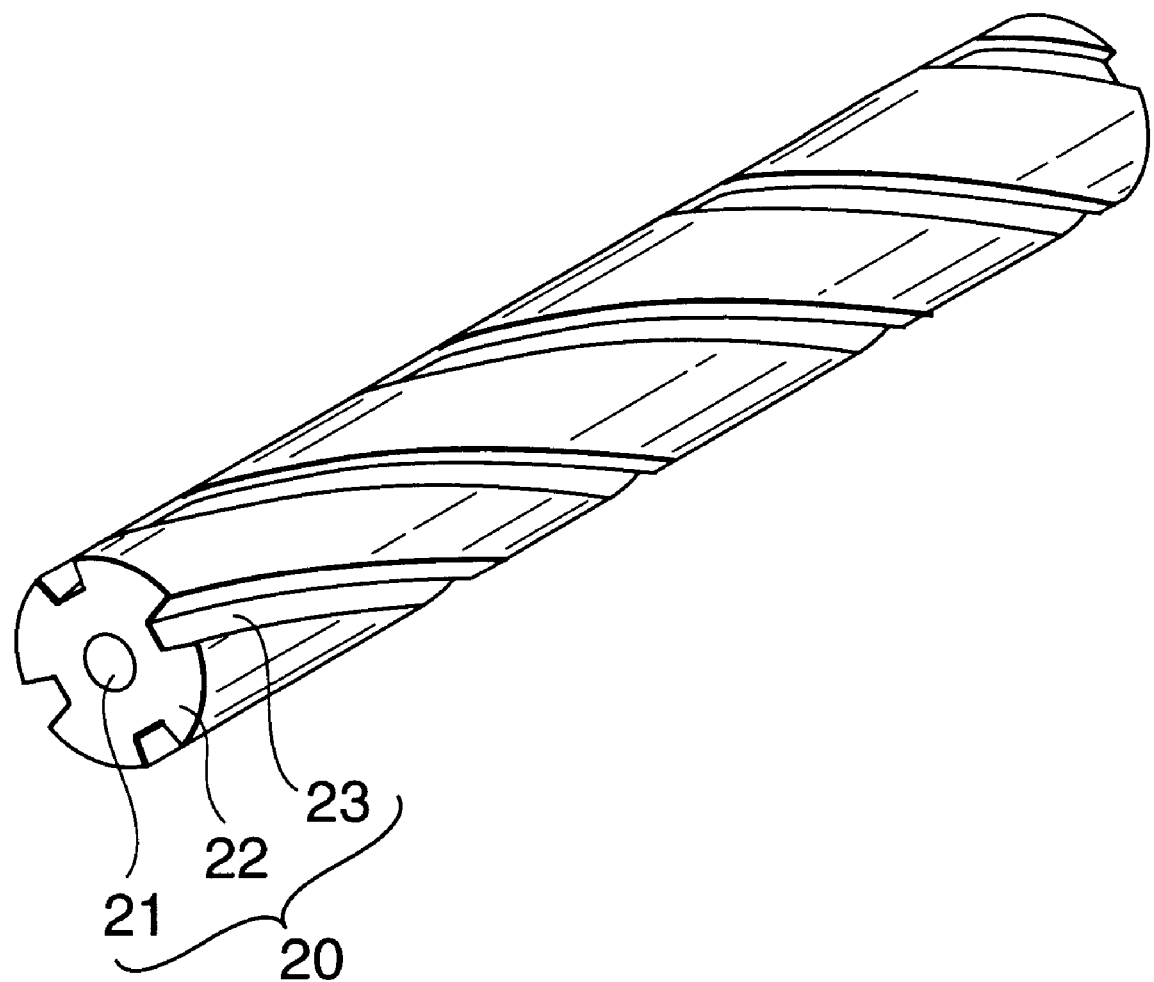
FIG. 3 is a perspective view of a spacer.
Figure 4A:
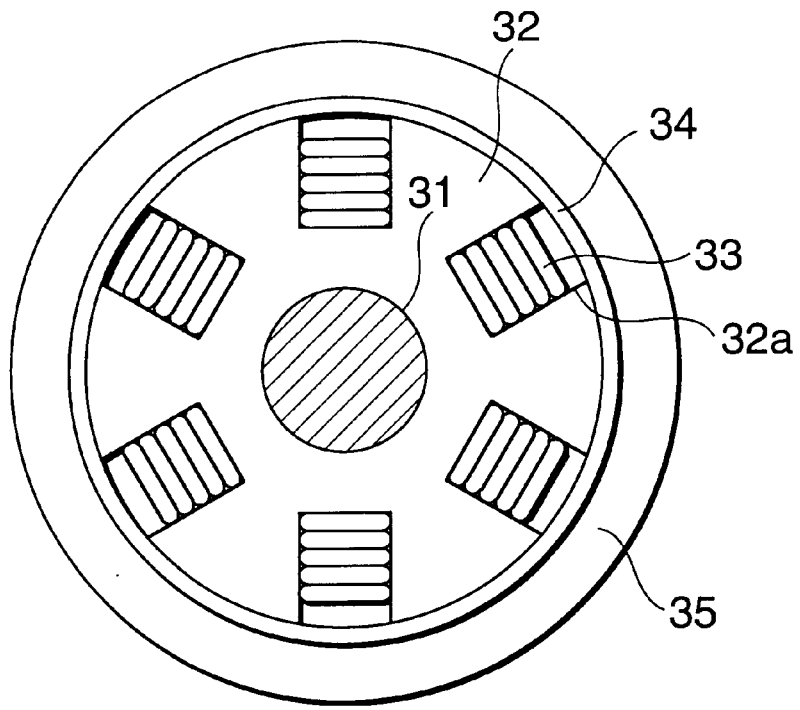
FIG. 4(A) is a cross-sectional view of an optical fiber cable using a spacer.
Figure 4B:
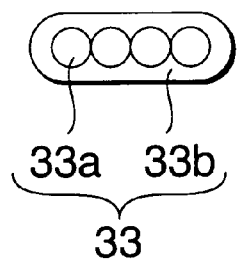
FIG. 4(B) is a cross-sectional view of an optical fiber ribbon used in the optical fiber cable.

Further, FIG. 2(C) is a cross-sectional view showing an example of a pressing device 15 that can be used instead of the pressing die 13. The pressing device 15 includes strings 15a each of which is a polyester string or the like suspended on the stranded structure 10, and a holding ring 15b holding the strings 15a. The pressing device 15 serves to press the surface of the stranded structure 10 by the strings 15a wound or suspended on the stranded structure 10.

Figure 7:
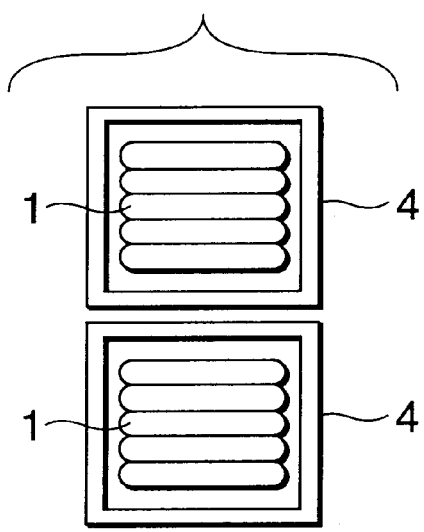
FIG. 7 is a cross-sectional view of alignment keeping guides constituting an embodiment of the present invention.
Figure 8:
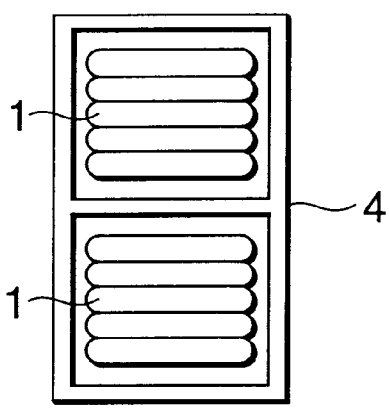
FIG. 8 is a cross-sectional view showing an alignment keeping guide constituting an embodiment of the present invention.
Figure 9:
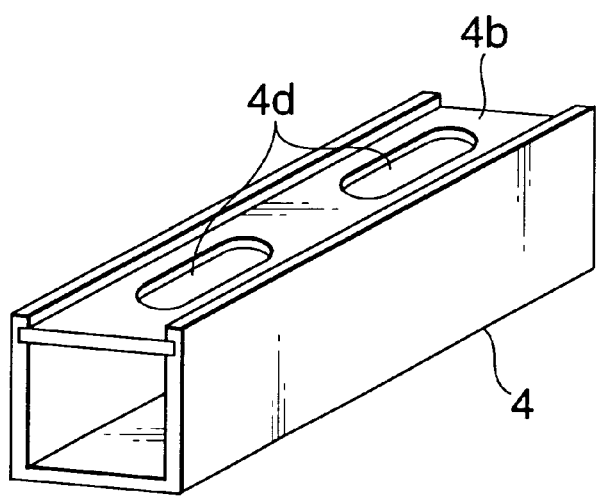
FIG. 9 is a perspective view showing an alignment keeping guide constituting an embodiment of the present invention.

Although the embodiment of the present invention has been described in connection with a case in which five optical fiber ribbons 1 are to be stored in one of grooves of the slotted rod or grooved spacer 6, the present invention should not be limited thereto or thereby. That is, the present invention is effectively applied to the case in which the number of the optical fiber ribbons 1 to be stored in one of grooves of the slotted rod or grooved spacer 6 is more than five or less than five. It is, however, preferable that the number of the optical fiber ribbons 1 to be superimposed by the hole 4c of the alignment keeping guide 4 is set to be five or less. For this reason, if the number of the optical fiber ribbons 1 per one groove of the spacer 6 is increased, then it is preferable that a plurality of alignment keeping guides 4 are provided or juxtaposed so that the optical fiber ribbons 1 to be stored in one groove of the spacer 6 are dividingly superimposed and guided by these alignment keeping guides 4. FIG. 7 shows a case in which five optical fiber ribbons 1 are superimposed and guided by each of two juxtaposed alignment keeping guides 4 so as to make the superimposed state of the ten optical fiber ribbons 4 stable before they are stored in one groove of the spacer 6. Alternatively, one or more partition wall(s) may be provided to define a plurality of holes in a single alignment keeping device 4. FIG. 8 shows a case in which five optical fiber ribbons 1 are superimposed and guided by each of two juxtaposed holes of a single alignment keeping guide 4 so as to make the superimposed state of the ten optical fiber ribbons 4 stable before they are stored in one groove of the spacer 6.

As a further modification, the alignment keeping guide 4 may have a window hole through which a surplus lubricant that has been applied to the optical fiber ribbons 4 by the lubricant application device 3 and that is likely to be clogged inside the alignment keeping guide 4 can be removed externally of the alignment keeping guide 4. FIG. 8 shows a case in which two window holes 4d are provided through the cover member 4b of the alignment keeping guide 4. The provision of the window hole is effective in avoiding the excessive tension onto the optical fiber ribbons 1, which may be caused due to the clogging of the tarc inside the alignment keeping guide 4.

What is claimed is:

1. An optical fiber ribbon stranding device for superimposing and accommodating a plurality of optical fiber ribbons into a corresponding one of spiral grooves provided in an outer circumferential surface of a spacer, said optical fiber ribbon stranding device comprising:
    a first device for advancing said spacer straight while rotating said spacer around a center axis of said spacer;
    a second device for feeding a plurality of optical fiber ribbons; and
    a guide having a plurality of rectangular holes through which each of said optical fiber ribbons is respectively passed prior to reaching said spacer so that said optical fiber ribbons are superimposed one on another and then stored into said corresponding one of said spiral grooves.

2. An optical fiber ribbon stranding device according to claim 1, wherein said guide includes a guide die and an alignment keeping guide disposed between said second device and said guide die.

3. An optical fiber ribbon stranding device for superimposing and accommodating a plurality of optical fiber ribbons into a corresponding one of spiral grooves provided in an outer circumferential surface of a spacer, said optical fiber ribbon stranding device comprising:

a first device for advancing said spacer straight while rotating said spacer around a center axis of said spacer;

a second device for feeding a plurality of optical fiber ribbons; and a guide having a rectangular hole said optical fiber ribbons are passed prior to reaching said spacer so that said optical fiber ribbons are superimposed one on another and then stored into said corresponding one of said spiral grooves;

wherein said rectangular hole has a height set to be 1.1 to 1.9 times as high as a height of said optical fiber ribbons in a superimposed state, and a width set to be 1.05 to 1.20 times as wide as a width of said optical fiber ribbons in said superimposed state.

4. An optical fiber ribbon stranding device according to claim 3 wherein said hole has a length set to be about 30 to 50 mm.

5. An optical fiber ribbon stranding device according to claim 1, wherein said guide includes:

a guide die for guiding said fed optical fiber ribbons into said corresponding one of said spiral grooves of said spacer; and an alignment keeping guide disposed upstream of said guide die, wherein said alignment keeping guide has said rectangular hole through which said optical fiber ribbons are passed while being superimposed one on another, thereby through said hole so as to be kept in a laminated state and so as to be formed into a lamination body, to thereby introduce said optical fiber ribbons thus superimposed into said corresponding one of said spiral grooves of said spacer through said guide die.

6. An optical fiber ribbon stranding device for superimposing and accommodating a plurality of optical fiber ribbons into a corresponding one of spiral grooves provided in an outer circumferential surface of a spacer, said optical fiber ribbon stranding device comprising:

a first device for advancing said spacer straight while rotating said spacer around a center axis of said spacer;

a second device for feeding a plurality of optical fiber ribbons; and a guide having a plurality of juxtaposed rectangular holes, wherein said optical fiber ribbons are divided into plural sets, and each sets of optical fiber ribbons are passsed through a corresponding one of said rectangular holes prior to reaching said spacer so that said optical fiber ribbons are superimposed one on another by respective rectangular holes and then collected and stored into said corresponding one of said spiral grooves; and wherein each of said rectangular holes has a height set to be 1.1 to 1.9 times as high as a height of a corresponding set of said optical fiber ribbons in a superimposed state, and a width set to be 1.05 to 1.20 times as wide as a width of said corresponding set of said optical fiber ribbons in said superimposed state.

7. An optical fiber ribbon stranding device for superimposing and accommodating a plurality of optical fiber ribbons into a corresponding one of spiral grooves provided in an outer circumferential surface of a spacer, said optical fiber ribbon stranding device comprising:

a first device for advancing said spacer straight while rotating said spacer around a center axis of said spacer;

a second device for feeding a plurality of optical fiber ribbons; and a plurality of alignment keeping guides, each having a rectangular holes, wherein said optical fiber ribbons are divided into plural sets, and each sets of optical fiber ribbons are passed through said rectangular hole of a corresponding one of said alignment keeping guides prior to reaching said spacer so that said optical fiber ribbons are superimposed one on another by respective rectangular holes and then collected and stored into said corresponding one of said spiral grooves; and wherein each of said rectangular holes has a height set to be 1.1 to 1.9 times as high as a height of a corresponding set of said optical fiber ribbons in a superimposed state, and a width set to be 1.05 to 1.20 times as wide as a width of said corresponding set of said optical fiber ribbons in said superimposed state.

8. An optical fiber ribbon stranding method comprising steps of:

passing a plurality of optical fiber ribbons fed from a plurality of reels through a plurality of rectangular holes of a guide, respectively, so as to superimpose said optical fiber ribbons one on another; and introducing and accommodating said optical fiber ribbons by said guide, substantially simultaneously, into a corresponding one of spiral grooves of a spacer that advances while rotating around an axis of said spacer at the same cycle as said spiral grooves are rotated in association with the advance of the spacer.

9. An optical fiber ribbon stranding device for superimposing and accommodating a plurality of optical fiber ribbons into a corresponding one of spiral grooves provided in an outer circumferential surface of a spacer, said optical fiber ribbon stranding device comprising:

a first device for advancing said spacer straight while rotating said spacer around a center axis of said spacer;

a second device for feeding a plurality of optical fiber ribbons;

a guide having a rectangular hole said optical fiber ribbons are passed prior to reaching said spacer so that said optical fiber ribbons are superimposed one on another and then stored into said corresponding one of said spiral grooves; and a cover member detachably coupled to the upper portion of said rectangular hole.

10. An optical fiber ribbon stranding device for superimposing and accommodating a plurality of optical fiber ribbons into a corresponding one of spiral grooves provided in an outer circumferential surface of a spacer, said optical fiber ribbon stranding device comprising:

a first device for advancing said spacer straight while rotating said spacer around a center axis of said spacer;

a second device for feeding a plurality of optical fiber ribbons; and a guide having a rectangular hole said optical fiber ribbons are passed prior to reaching said spacer so that said optical fiber ribbons are superimposed one on another and then stored into said corresponding one of said spiral grooves, said guide including:

a guide die for guiding said fed optical fiber ribbons into said corresponding one of said spiral grooves of said spacer; and an alignment keeping guide disposed upstream of said guide die, wherein said alignment keeping guide has said rectangular hole through which said optical fiber ribbons are passed while being superimposed one on another, thereby through said hole so as to be kept in a laminated state and so as to be formed into a lamination body, to thereby introduce said optical fiber ribbons thus superimposed into said corresponding one of said spiral grooves of said spacer through said guide die;

wherein said hole of said alignment keeping guide has a height set to be 1.1 to 1.9 times as high as said optical fiber ribbons in a superimposed state, a width set to be 1.05 to 1.20 times as wide as said optical fiber ribbons in said superimposed state, and a length set to be not shorter than 10.

11. An optical fiber ribbon stranding device for superimposing and accommodating a plurality of optical fiber ribbons into a corresponding one of spiral grooves provided in an outer circumferential surface of a spacer, said optical fiber ribbon stranding device comprising:

a first device for advancing said spacer straight while rotating said spacer around a center axis of said spacer;

a second device for feeding a plurality of optical fiber ribbons;

a guide having a rectangular hole said optical fiber ribbons are passed prior to reaching said spacer so that said optical fiber ribbons are superimposed one on another and then stored into said corresponding one of said spiral grooves, said guide including:

a guide die for guiding said fed optical fiber ribbons into said corresponding one of said spiral grooves of said spacer;

an alignment keeping guide disposed upstream of said guide die, wherein said alignment keeping guide has said rectangular hole through which said optical fiber ribbons are passed while being superimposed one on another, thereby through said hole so as to be kept in a laminated state and so as to be formed into a lamination body, to thereby introduce said optical fiber ribbons thus superimposed into said corresponding one of said spiral grooves of said spacer through said guide die; and a spiral separator, provided between said guide dies and a point where said optical fiber ribbons are inserted into said corresponding one of said spiral grooves of said spacer, for temporarily separating said optical fiber ribbons thus superimposed.

12. An optical fiber ribbon stranding device for superimposing and accommodating a plurality of optical fiber ribbons into a corresponding one of spiral grooves provided in an outer circumferential surface of a spacer, said optical fiber ribbon stranding device comprising:

a first device for advancing said spacer straight while rotating said spacer around a center axis of said spacer;

a second device for feeding a plurality of optical fiber ribbons;

a guide having a rectangular hole said optical fiber ribbons are passed prior to reaching said spacer so that said optical fiber ribbons are superimposed one on another and then stored into said corresponding one of said spiral grooves, said guide including:

a guide die for guiding said fed optical fiber ribbons into said corresponding one of said spiral grooves of said spacer; and an alignment keeping guide disposed upstream of said guide die, wherein said alignment keeping guide has said rectangular hole through which said optical fiber ribbons are passed while being superimposed one on another, thereby through said hole so as to be kept in a laminated state and so as to be formed into a lamination body, to thereby introduce said optical fiber ribbons thus superimposed into said corresponding one of said spiral grooves of said spacer through said guide die; and a lubricant application device, provided between said second device and said guide, for applying a lubricant onto at least one surface of each of said optical fiber ribbons.

13. An optical fiber ribbon stranding device for superimposing and accommodating a plurality of optical fiber ribbons into a corresponding one of spiral grooves provided in an outer circumferential surface of a spacer, said optical fiber ribbon stranding device comprising:

a first device for advancing said spacer straight while rotating said spacer around a center axis of said spacer;

a second device for feeding a plurality of optical fiber ribbons; and a guide having a rectangular hole said optical fiber ribbons are passed prior to reaching said spacer so that said optical fiber ribbons are superimposed one on another and then stored into said corresponding one of said spiral grooves, said guide including:

a guide die for guiding said fed optical fiber ribbons into said corresponding one of said spiral grooves of said spacer; and an alignment keeping guide disposed upstream of said guide die, wherein said alignment keeping guide has said rectangular hole through which said optical fiber ribbons are passed while being superimposed one on another, thereby through said hole so as to be kept in a laminated state and so as to be formed into a lamination body, to thereby introduce said optical fiber ribbons thus superimposed into said corresponding one of said spiral grooves of said spacer through said guide die;

wherein said hole is defined by a member made of fluorine resin.

14. An optical fiber ribbon stranding method comprising steps of:

applying a lubricant onto a plurality of optical fiber ribbons fed from a plurality of reels;

passing said plurality of optical fiber ribbons through a plurality of rectangular holes of a guide, respectively, so as to superimpose said optical fiber ribbons one on another;

introducing and accommodating said optical fiber ribbons by said guide, substantially simultaneously, into a corresponding one of spiral grooves of a spacer that advances while rotating around an axis of said spacer at the same cycle as said spiral grooves are rotated in association with the advance of the spacer.

* * * * *